July 20, 1965 R. G. MINER 3,195,318
ABSORPTION REFRIGERATING SYSTEM
Filed April 23, 1962 2 Sheets-Sheet 1

INVENTOR.
ROBERT G. MINER
BY *Holmes & Andersen*
ATTORNEYS

INVENTOR.
ROBERT G. MINER
BY
Holmes & Andersen
ATTORNEYS

United States Patent Office
3,195,318
Patented July 20, 1965

3,195,318
ABSORPTION REFRIGERATING SYSTEM
Robert G. Miner, La Crosse, Wis., assignor to The Trane Company, La Crosse, Wis., a corporation of Wisconsin
Filed Apr. 23, 1962, Ser. No. 189,335
6 Claims. (Cl. 62—148)

This invention relates to absorption refrigerating systems and more particularly to controls for such systems.

The controls for such refrigerating systems commonly provide means for starting the various parts in sequence responsive to manually closing an electrical circuit to one of the pumps.

It is also common for such controls to provide means for discontinuing operation in such a manner that concentration of solution and solidification is avoided.

It is an object of this invention to provide means for controlling the refrigeration capacity of an absorption refrigerating system which uses a heated liquid as a source of heat in the generator of the system.

It is another object of this invention to provide control of the heat input to the generator of an absorption refrigerating system by varying the temperature of heating fluid entering the generator responsive to the temperature of the evaporator or the liquid cooled by the evaporator.

It is another object of this invention to provide means for slowly increasing the rate of flow of heating medium to the generator of an absorption machine when the machine is started after being inoperative.

It is another object of this invention to provide means for slowly increasing the temperature of heating fluid supplied to the generator of an absorption refrigerating system when the system is started after being inoperative.

Other objects and advantages will become apparent as the specification proceeds to describe the invention with reference to the accompanying drawings in which.

Figure 1:
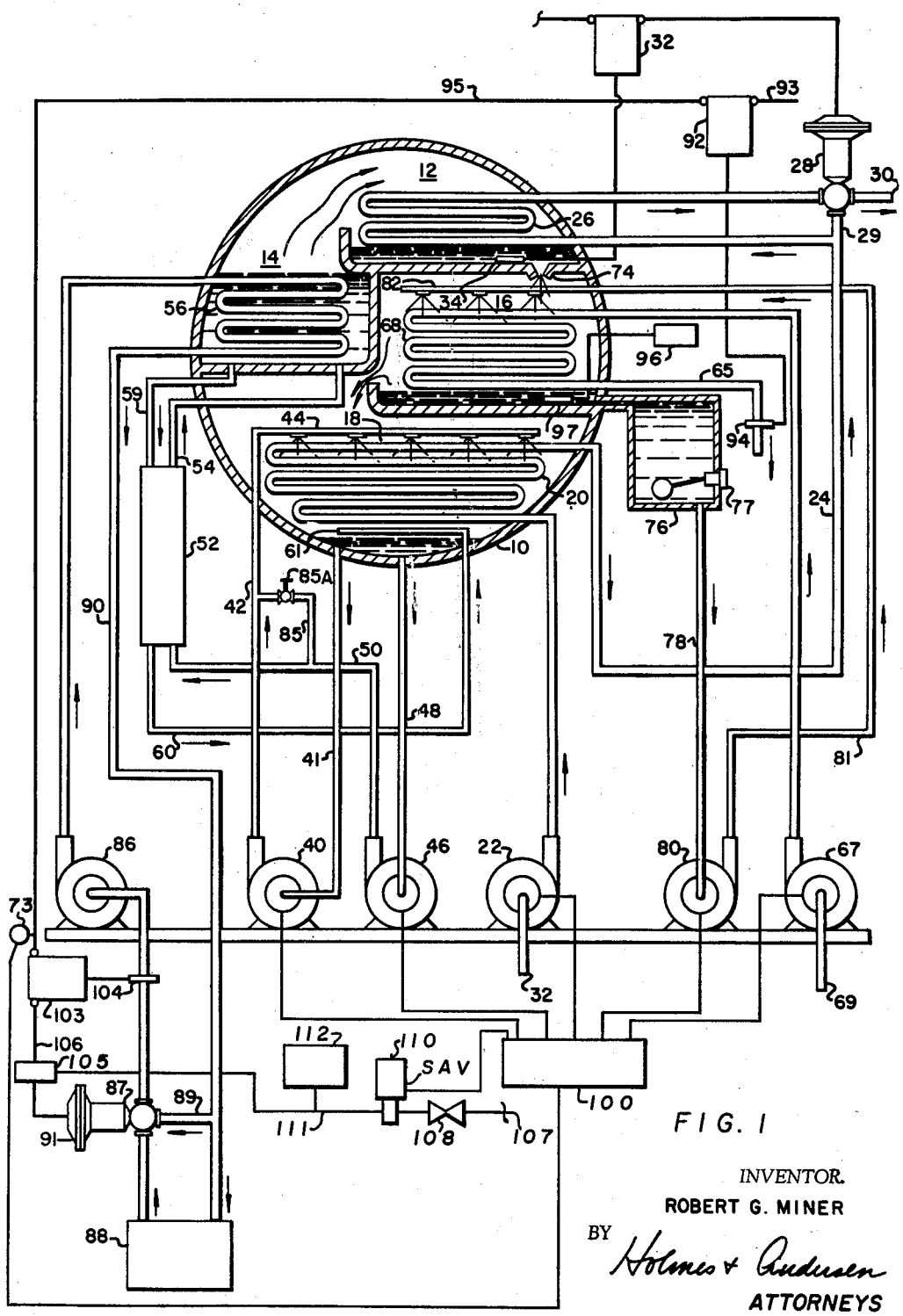
FIGURE 1 is a diagrammatic view of the absorption system including the controls.

Referring now to FIGURE 1, the absorption system shown has a single shell 10 enclosing a condenser 12, a generator 14, an evaporator 16 and an absorber 18. It should be understood that other arrangements might be used; for instance, the generator and condenser could be in one shell and the absorber and evaporator could be in a second shell with conduits therebetween for conducting fluids.

The absorber 18 has a coil 20 supplied with cooling fluid by a pump 22 from a source of water 32 which is preferably of substantially constant temperature. This cooling fluid is conducted from the coil 20 through a conduit 24 to a cooling coil 26 in the condenser 12. From the cooling coil 26, the cooling fluid passes through a pneumatic valve 28 and thence through a conduit 30 to a cooling tower (not shown) or to waste. A portion of the fluid flowing in pipe 24 may bypass the coil 26 through the conduit 29 according to the position of the pneumatic valve 28 which is controlled by pneumatic thermostat 32 which has a temperature sensing bulb 34 in the liquid in the condenser 12. Refrigerant vapor from the generator 14 is condensed in condenser 12 by removal of heat through cooling coil 26.

Various types of refrigerant and absorbent may be used in the present machine. A solution of lithium bromide and water is satisfactory. Other combinations of refrigerants and absorbents may be used if desired.

A solution circulating pump 40 receives solution from the absorber 18 through conduit 41, and discharges the solution into a conduit 42 which is connected to a spray tree 44 which sprays the solution into the absorber 18 over the tubes 20.

A pump 46 draws solution from the absorber 18 through a conduit 48 and discharges the solution through a conduit 50 which conducts the fluid to a heat exchanger 52 from which the fluid flows through a conduit 54 to the generator 14.

The solution in the generator is heated by a coil 56 which is supplied with a heating liquid such as water, Dow-Therm, etc. in a manner described below. Boiling of the solution in the generator causes refrigerant vapors to pass into the condenser 12.

The concentrated solution flows from the generator 14 through conduit 59 to heat exchanger 52 and thence through conduit 60 and 61 to the absorber 18. The outlet of conduit 61 is adjacent the entrance to conduit 41 and remote from the entrance to conduit 48 so that the solution flowing in conduit 41 is more concentrated than the solution flowing in conduit 48. The conduits 41 and 48 may be spaced longitudinally of the shell for the same reason if desired. In the heat exchanger 52, the dilute solution passing from the absorber 18 to the generator 14 is heated by the concentrated solution flowing from the generator 14 to the absorber 18.

The fluid in circulation through the coil 68 of the evaporator 16 may be water, brine, or other fluid, but for purposes of explanation, it will be assumed to be water, and it will be called chilled water. A chilled water pump 67 is connected to receive chilled water from a refrigeration load through a conduit 69. After flowing through coil 68, the chilled water is returned to the refrigeration load through conduit 65.

The refrigerant condensed in the condenser 12 flows downwardly through an opening 74 into the evaporator 16. The evaporator has a float chamber 76 containing a float switch 77 which opens when the level drops below a predetermined point. A conduit 78 conducts a refrigerant from the float chamber 76 to a refrigerant pump 80. The refrigerant flows from the pump 80 through a conduit 81 to a spray tree 82 in the evaporator 16. As indicated by arrows, refrigerant vapor flows from the evaporator 16 to the absorber 18 thus causing evaporation and cooling of the refrigerant liquid in the evaporator 16.

A low temperature cut-out switch 96 has a temperature sensitive bulb 97 in the refrigerant in the evaporator 16. Switch 96 initiates a shut down of the machine when the evaporator temperature drops below a predetermined point as explained in detail in my U.S. Patent No. 3,005,318, dated October 24, 1961.

A conduit 85 conducts fluid from conduit 50 to conduit 42. A valve 85A provides means for regulating flow in conduit 85. As is explained more fully in my U.S. Patent No. 3,005,318, dated October 24, 1961, the absorber recirculation pump 40 and the condenser water pump 22 are the first pumps to be de-energized when the machine is shut down. Inasmuch as the solution pump 46 continues to operate for a timed period, a portion of the solution delivered by it will flow through conduit 85. This solution will flow by gravity downward through pipe 42, then through pump 40 into conduit 41 and finally into the bottom of the absorber 18. The more concentrated solution in these conduits and in pump 40 is thus flushed out by the more dilute solution from pump 46 and the danger of solidification in these passageways when the system cools down is avoided. The solution in the spray tree 44 drains by gravity when the pump 40 is de-energized. When the machine is in normal operation, the pressure developed by pump 40 opposes flow through conduit 85 so that there is substantially no flow in this conduit 85.

The coil 56 in the generator 14 is supplied with heating liquid by a pump 86 driven by an electric motor or other suitable prime mover not shown. A pneumatic three way valve 87 has an actuating pneumatic motor 91. Valve 87 has a normally closed connection to a heating source 88 such as a hot water boiler. Valve 87 has a normally open connection to conduit 89 which receives fluid from conduit 90. Conduit 90 conducts fluid from the coil 56 back to the heating source 88. Valve 87 is connected to deliver fluid to the suction of the pump 86. Pneumatic motor 91 is of the type commonly used to reciprocate the valve stem of a valve. Motor 91 may be of the type shown in Patent No. 2,892,608.

The control of the valve 87 will now be described. A chilled water pneumatic thermostat 92 is connected to the usual source of air under pressure 93 and has a temperature sensitive bulb 94 in temperature sensing relationship with the chilled water leaving the evaporator coil 68 through the conduit 65. The temperature in conduit 65 is substantially the same as the temperature of evaporator 16. A rise in temperature of the water in conduit 65 indicates an increase in load imposed upon the system. Thermostat 92 is a commercially available instrument which transmits a signal in the form of pressure, through conduit 95, of a magnitude proportional to the temperature of the fluid measured. Thermostat 92 being connected to a source of pneumatic pressure 93 transmits a signal in the form of pressure through conduit 95 to a temperature limiting thermostat 103. Thermostat 103 is a reverse acting pneumatic thermostat which is commercially available and which transmits a signal in the form of pressure inversely proportional to the temperature measured. Thermostat 103 has a temperature sensitive bulb 104 in temperature sensing relationship with the fluid flowing from valve 87 to pump 86 and limits the signal in the form of pressure transmitted to valve 87 to prevent the temperature of water supplied to the generator from exceeding a predetermined value. Thermostat 103 transmits a signal in the form of pressure to a pneumatic relay 105 through conduit 106. Pneumatic relay 105 determines how much of the signal in the form of pressure in conduit 106 is transmitted to the pneumatic motor 91 of valve 87.

A pressure switch 73 is connected in fluid communication with conduit 95 and is electrically connected to the electrical control 100. The electrical control 100 is shown and described in detail in my U.S. Patent 3,005,318. When the temperature of the chilled water rises above a predetermined point as sensed by thermostat 92, pressure switch 73 closes and causes control 100 to go through a starting cycle including energization of pumps 40, 46, 22, 80, and 67, and also energization of solenoid air valve SAV. Solenoid air valve SAV is connected to a source of air pressure 107 with a restrictor 108 interposed therebetween. When SAV is energized, it opens and transmits air through conduit 111 to pneumatic relay 105.

Interposed in conduit 111 is an accumulator in the form of a volume tank 112. Inasmuch as the volume tank 112 must be filled by air passing through the restrictor 108, it is possible to make the size of the volume tank and the size of the restrictor such that any desired rate of increase in pressure in conduit 111 will be obtained. It is thus seen that the volume tank provides a time delay to the increase of pressure imposed on motor 91. When solenoid air valve SAV is de-energized, it exhausts air from conduit 111 and volume tank 112 through port 110.

The modification of FIGURE 2 will now be described. Parts which correspond with parts in the form of FIGURE 1 have the same designating numerals. A hot water boiler 113 has a heat exchanger 115 heated in any suitable manner as by products of combustion. A pump 114 circulates the heating fluid through the system supply main 116 and the system return main 118. A conduit 120 conducts fluid from supply main 116 to a normally closed pneumatic two-way valve 122. Valve 122 has an actuating pneumatic motor 123. The conduit 90 conducts fluid to conduit 124 which conducts fluid to the pump 86. Conduit 90 also conducts fluid to conduit 126 which in turn conducts fluid to the return main 118. When the valve 122 is closed, the pump 86 merely recirculates fluid leaving the coil 56 through conduit 90 and conduit 124. As the demand for heat increases, the valve 122 opens to increase the flow of heating fluid from the main 116 to the pump 86. The pressure in the supply main is considerably greater than the pressure in the return main. Therefore, the position of the valve 122 determines the temperature of heating fluid flowing to the pump 86 and thence to the generator. Thermostat 103 having a bulb 104 limits the pressure transmitted to the motor 123 of valve 122 to prevent the temperature of the water flowing to pump 86 from exceeding a predetermined value. An increase in temperature of the chilled water, indicating an increase in load on the machine, increases the temperature of water supplied to the machine to increase its output. This form of the invention of FIGURE 2, has the relay 105, the volume tank 112, the solenoid valve SAV, the restrictor 108 and the source of pressure 107 connected in a like manner to that shown and described with reference to FIGURE 1. The form of FIGURE 2 also has the pressure switch 73 and the control mechanism 100 which controls energization of solenoid valve SAV in the same manner as described with reference to FIGURE 1.

Figure 3:
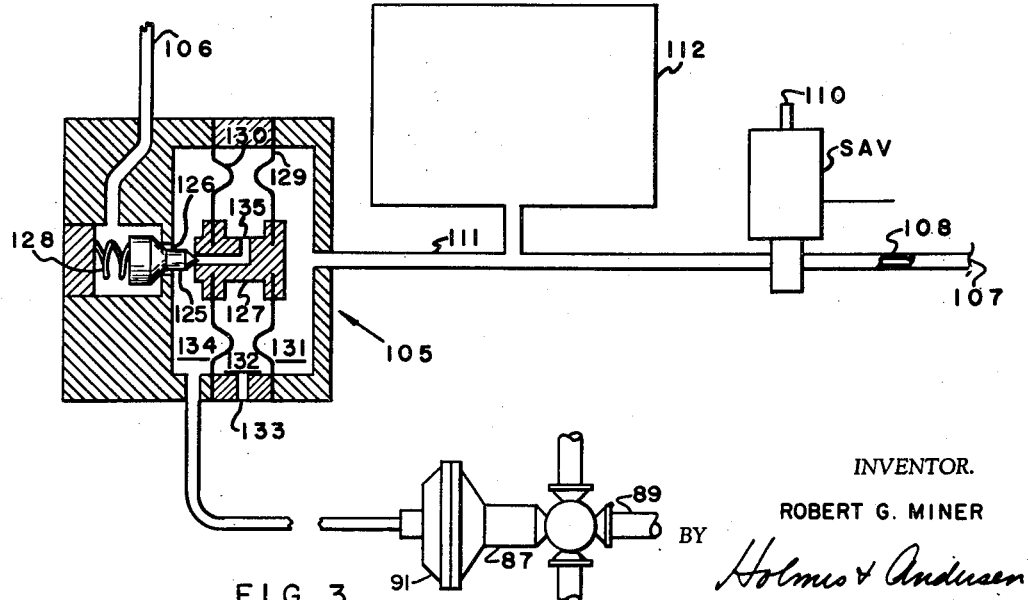
FIGURE 3 is an enlarged view showing details of the relay 105 and its associated controls.

Referring now to FIGURE 3, the relay 105 from FIGURE 1 is shown in detail. The relay 105 receives a control pressure from thermostat 103 through conduit 106. A valve plug 125 moves with respect to port 126 to determine how much of this pressure is transmitted to the valve 87. A spool 127 moves the valve plug 125 against the force of a spring 128. The spool 127 is mounted in flexible diaphragms 129 and 130 which form a first chamber 131 in communication with conduit 111 and a second chamber 132 open to the atmosphere through opening 133. Diaphragm 130 also forms a third chamber 134. As explained above, air is admitted to chamber 134 according to the position of valve plug 125 with respect to the port 126. Air is exhausted from chamber 134 through hole 135 in spool 127 according to the position of spool 127 with respect to valve plug 125. It is thus seen that relay 105 will transmit from thermostat 103 to valve 87 a pressure equal to but not greater than the pressure received from conduit 111. Air flows at a slow rate from source 107 through restrictor 108 to conduit 111. Therefore, when solenoid valve SAV is first energized, it takes a considerable period of time for pressure to build up in tank 112 which has a relatively large volume. Inasmuch as tank 112 is in fluid communication with conduit 111, the pressure in conduit 111 is always equal to that in tank 112. In view of the above explanation it is apparent that on startup of the system the pressure transmitted by relay 105 to the motor 123 of valve 87 increases at a slow rate after valve SAV is first opened. The slow rate of opening of valve 87 prevents abnormal operation of the absorption system which would occur if heat were applied suddenly to the generator 14. Such abnormal operation can cause noise and it can damage the system.

The slow rate of opening of valve 87 also has the advantage that a sudden load is not put on the heating source supplying the absorption system. A sudden load could deprive other machines supplied by the same source of heating liquid and cause them to lose control.

The operation of the system will now be described. Referring to FIGURE 1, when the chilled water thermostat 92 senses an increase of the temperature of the liquid in the conduit 65 as a result of an increase in the cooling load of the system, it will increase its air pressure in the conduit 95. Subject to its temperature limiting function, thermostat 103 transmits this increased pressure to the motor 91 of valve 87. This increase in pressure will cause the three-way valve 87 to reduce the flow of recirculated heating medium through the conduit 89 and increase the quantity of heating medium flowing to the pump 86 from the source 88 thus increasing the quantity of heat supplied to the generator 56. This increase in heat input will continue until the entire system reaches a new equilibrium where the amount of heating medium introduced into the loop, consisting of the pump 86, the generator 56, the conduit 90, and the bypass conduit 89, is just sufficient to provide the necessary cooling effect to maintain the temperature in the conduit 65 at the setting of the chilled water thermostat 92.

On reduction in load on the cooling system, the reverse will occur. The chilled water thermostat 92 will reduce the pressure transmitted through conduit 95 and thence through thermostat 103 to the motor of valve 87 to increase the recirculated heating medium through the conduit 89 and reduce the flow of heating medium from the source 88 until equilibrium is again reached.

Figure 2:
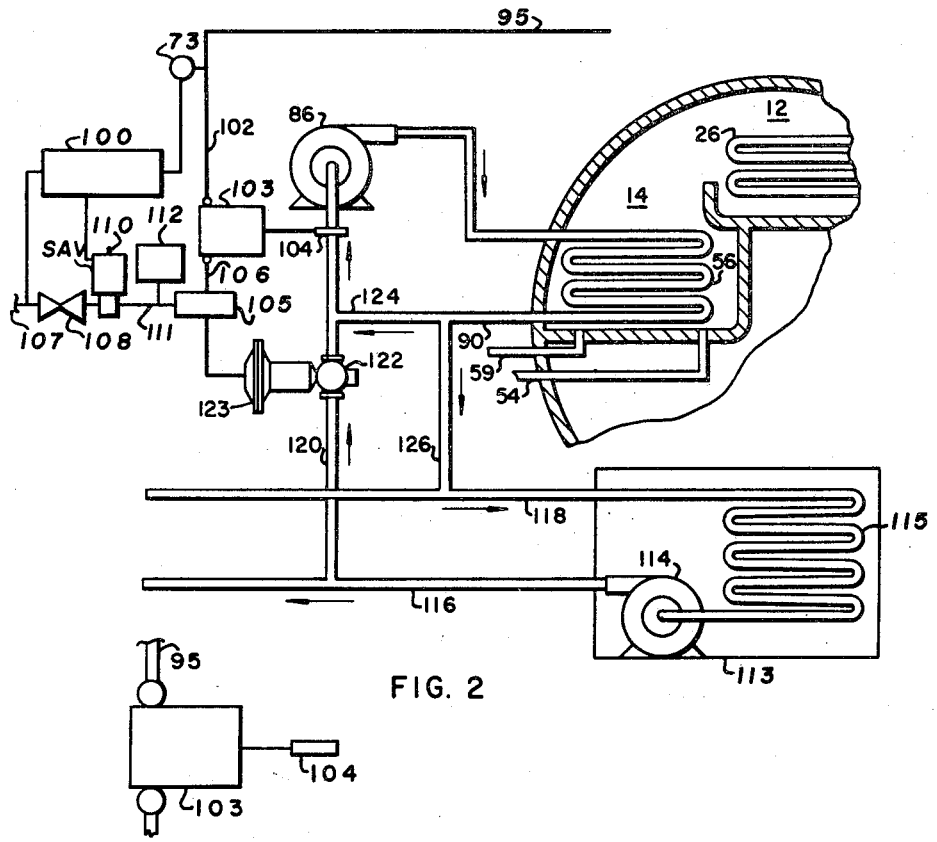
FIGURE 2 is a diagrammatic view of a second form of the absorption system and the controls thereof.

The system of FIGURE 2 operates in a manner similar to that described with respect to FIGURE 1.

Although I have described specific embodiments of my invention, it is contemplated that various changes may be made without departing from the spirit of my invention, and I desire to be limited only by the claims.

I claim:

1. In an absorption refrigerating system, the combination of an absorber, an evaporator, a condenser and a generator placed in a closed circuit, the circuit containing a solution of an absorbent and a refrigerant, a normally closed valve for regulating the flow of heating fluid in heat transfer relationship with said generator, a motor for controlling said valve, a pneumatic thermostat for transmitting a signal to said motor to open said valve responsive to the temperature of said evaporator, means for reducing the signal transmitted to said motor, and time delay means responsive to the temperature of said evaporator for progressively rendering said signal reducing means ineffective.

2. In an absorption refrigeration system, the combination of an absorber, an evaporator, a condenser, and a generator placed in a closed circuit, the circuit containing a solution of an absorbent and a refrigerant, valve means for regulating the flow of heating medium in heat transfer relationship with said generator, a motor for operating said valve means, thermostatic means responsive to load conditions for controlling said motor, means for restricting the rate at which said motor operates said valve means to increase the rate of flow of heating medium in heat transfer relationship with said generator and time delay means responsive to a condition indicating the need for operation of said system for rendering said restricting means inoperative.

3. In an absorption refrigeration system, the combination of an absorber, an evaporator, a condenser, and a generator placed in a closed circuit, the circuit containing a solution of an absorbent and a refrigerant, valve means for regulating the flow of heating fluid in heat transfer relationship with said generator, a motor for controlling said valve means, thermostatic means responsive to the temperature of said evaporator for controlling said motor, means for starting operation of the system responsive to the temperature of said evaporator, means responsive to said starting means for reducing the effect of said thermostatic means on said motor, and time delay means for rendering said reducing means ineffective.

4. In an absorption refrigerating system, the combination of an absorber, an evaporator, a condenser and a generator placed in a closed circuit, the circuit containing a solution of an absorbent and a refrigerant, valve for regulating the flow of heating fluid in heat transfer relationship with said generator, a motor for controlling said valve, a pneumatic thermostat for controlling said motor responsive to the temperature of said evaporator, conduit connecting said pneumatic thermostat to said motor to transmit control pressure from said pneumatic thermostat to said motor, a first means in said conduit for controlling the pressure transmitted from said thermostat to said motor, second means responsive to the temperature of said evaporator for connecting said first means to a source of air under pressure, accumulating means between said second means and said first means to time delay the effect of said first means on the pressure transmitted from said thermostat to said motor.

5. In an absorption refrigerating system, the combination of an absorber, an evaporator, a condenser and a generator placed in a closed circuit, the circuit containing a solution of an absorbent and a refrigerant, a normally closed valve for regulating the flow of heating fluid in heat transfer relationship with said generator, a motor for controlling said normally closed valve, a pneumatic thermostat for controlling said motor responsive to the temperature of said evaporator, conduit connecting said pneumatic thermostat to said motor to transmit control pressure from said pneumatic thermostat to said motor, a relay in said conduit for controlling the pressure transmitted from said thermostat to said motor, means responsive to the temperature of said evaporator for connecting said relay to a source of air under pressure, accumulating means between said last mentioned means and said relay to time delay the rate of transition of said relay from minimum pressure transmitting operation to maximum pressure transmitting operation.

6. In an absorption refrigerating system, the combination of an absorber, an evaporator, a condenser and a generator placed in a closed circuit, the circuit containing a solution of an absorbent and a refrigerant, a normally closed valve for regulating the flow of heating fluid from a source to heat transfer relationship with said generator, a motor for controlling said normally closed valve, a first pneumatic thermostat for controlling said motor responsive to the temperature of said evaporator, conduit connecting said first pneumatic thermostat to said motor to transmit control pressure from said pneumatic thermostat to said motor, a second pneumatic thermostat interposed in said conduit between said first pneumatic thermostat and said valve, said second pneumatic thermostat being responsive to the temperature of heating fluid flowing to said generator and having means to reduce the pressure transmitted to said valve to prevent the temperature of heating fluid supplied to said generator from exceeding a predetermined value, a relay in said conduit for reducing the pressure transmitted to said motor, means responsive to said pneumatic thermostat for connecting said relay to a source of air under pressure, accumulating means between said last mentioned means and said relay to time delay the progress of said relay from minimum pressure transmitting operation to maximum pressure transmitting operation.

References Cited by the Examiner

UNITED STATES PATENTS

| | | | |
|---|---|---|---|
| 2,733,575 | 2/56 | Leonard | 62—104 |
| 2,770,953 | 11/56 | Leonard | 62—104 |
| 2,817,213 | 12/57 | Miner | 62—230 |
| 3,002,359 | 10/61 | Miner | 62—148 |
| 3,005,318 | 10/61 | Miner | 62—141 |
| 3,019,613 | 2/62 | Leonard | 62—141 X |
| 3,019,616 | 2/62 | Papapanu | 62—141 |
| 3,053,056 | 9/62 | Leonard | 62—104 |

ROBERT A. O'LEARY, *Primary Examiner.*

EDWARD J. MICHAEL, *Examiner.*